(12) United States Patent
Hayrapetian et al.

(10) Patent No.: US 9,824,090 B2
(45) Date of Patent: Nov. 21, 2017

(54) EMULATING TRANSPARENT FILE PROCESSING

(71) Applicant: Sophos Limited, Abingdon Oxfordshire (GB)

(72) Inventors: Gregory Hayrapetian, Linz (AT); Markus Hein, Linz (AT); Martin Huch, Linz (AT); Oliver Lorenz, Linz (AT); Johann Murauer, Pregarten (AT); Stefan Perndl, Linz (AT); Christian Praher-Köppl, Linz (AT); Bernhard Traunmüller, Altenberg (AT); Gerald Wintersberger, Eferding (AT); Michael Zach, Linz (AT)

(73) Assignee: Sophos Limited, Abingdon (GB)

( * ) Notice: Subject to any disclaimer, the term of this patent is extended or adjusted under 35 U.S.C. 154(b) by 370 days.

(21) Appl. No.: 14/682,186

(22) Filed: Apr. 9, 2015

(65) Prior Publication Data
US 2016/0299892 A1    Oct. 13, 2016

(51) Int. Cl.
*G06F 7/02* (2006.01)
*G06F 17/30* (2006.01)

(52) U.S. Cl.
CPC .... *G06F 17/3012* (2013.01); *G06F 17/30076* (2013.01); *G06F 17/30091* (2013.01); *G06F 17/30138* (2013.01); *G06F 17/30174* (2013.01); *G06F 17/30235* (2013.01)

(58) Field of Classification Search
CPC ......... G06F 17/30091; G06F 17/30233; G06F 17/3012; G06F 17/30138; G06F 17/30174; G06F 17/30235; G06F 17/30238; G06F 17/30076
See application file for complete search history.

(56) References Cited

U.S. PATENT DOCUMENTS

| | | | | |
|---|---|---|---|---|
| 5,905,990 A * | 5/1999 | Inglett | ............... | G06F 17/30067 |
| 5,991,753 A * | 11/1999 | Wilde | ............... | G06F 17/30067 |
| 7,181,439 B1 * | 2/2007 | Lent | ................. | G06F 17/30067 |
| 8,055,907 B2 * | 11/2011 | Deem | ....................... | G06F 9/44 |
| | | | | 711/100 |
| 2003/0187822 A1 | 10/2003 | Lefurgy et al. | | |

OTHER PUBLICATIONS

IPO, "UK Application No. 1605497.5 Search Report dated Sep. 15, 2016", 4 pages.

* cited by examiner

*Primary Examiner* — Bruce Moser
(74) *Attorney, Agent, or Firm* — Strategic Patents, P.C.

(57) ABSTRACT

Transparent file processing is supported in Unix-like operating systems by emulating the desired file processing through a number of recipes that accommodate different contexts. Recipes are provided, for example, for local folders in user space, for whole devices (e.g., flash drives or network drives), and for folders synchronized to cloud data. By detecting the path type for a file operation and selecting and applying the appropriate recipe, file processing can be performed in a manner transparent to the user.

17 Claims, 4 Drawing Sheets

EMULATING TRANSPARENT FILE PROCESSING

TECHNICAL FIELD

This application relates to file processing, and more particularly to emulating transparent file processing on Unix-like operating systems without support of an in-kernel stacking or filter file system.

BACKGROUND

Transparent file processing may occur when files are moved within a user space of a file system. For example, where a folder in a user space is encrypted, files may be correspondingly encrypted and decrypted as they are moved in and out of the folder. Transparent file processing may also include compression, changes to file attributes or user rights, and so forth. While some operating systems seamlessly support this type of transparent file processing, no such alternative exists for Unix-like operating systems.

There remains a need for transparent file processing on Unix-like operating systems.

SUMMARY

Transparent file processing is supported in Unix-like operating systems by emulating the desired file processing through a number of recipes that accommodate different contexts. Recipes are provided, for example, for local folders in user space, for physical devices (e.g., flash drives or network drives), and for folders synchronized to cloud data. By detecting the path type for a file operation and selecting and applying the appropriate recipe, file processing can be performed in a manner transparent to the user.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

Figure 1:
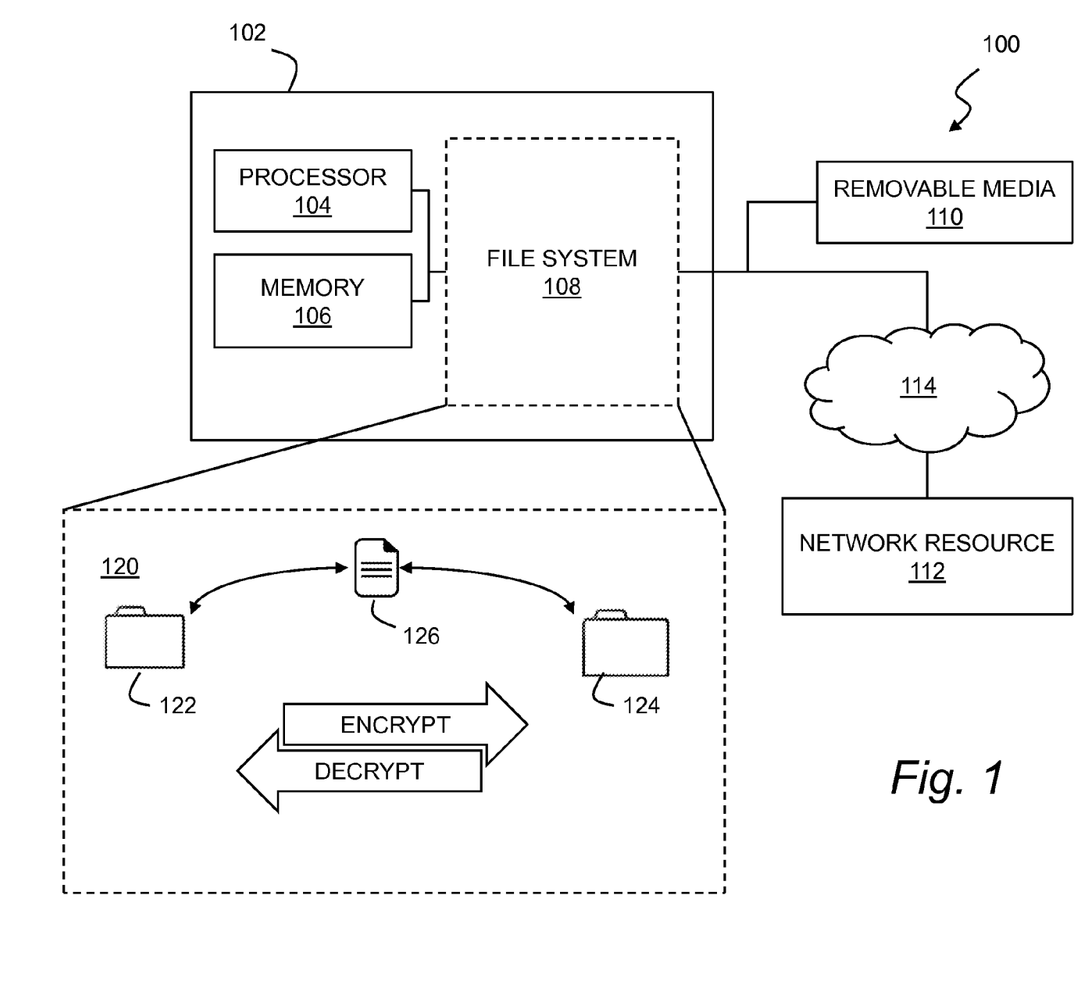
FIG. 1 shows a system for emulating transparent file processing.

FIG. 1 shows a system for emulating transparent file processing. In general, the system 100 may include a device 102 with a processor 104 and a memory 106, such as a desktop computer, laptop computer, tablet, mobile device, or virtual machine executing on a virtual machine host. The device 102 may include computer code stored in the memory 106 that configures the processor to emulate transparent file processing as contemplated herein.

The processor 104 and memory 106 may generally support a file system 108 that controls how data is stored and retrieved by the computer. Typically, a Unix-like operating system creates a virtual file system that makes all files on the device 102 and elsewhere appear to exist in a single hierarchy. Thus while the file system 108 is depicted within the device 102, the file system 108 may extend to removable media 110, network shared resources 112 accessible through a data network 114, and so forth.

An abstract view 120 of the file system 108 shows two locations, a first location 122 and a second location 124, with a file 126 being moved between the locations by a user. The first location 122 and the second location 124 may be any locations within the file system 108. For example, the locations 122, 124 may include file existing folders in the file system within a local directory structure on the device 102. The locations 122, 124 may also or instead include removable media such as flash drives, pen drives, removable or portable disk drives, network drives, or any other physical device, or logical device or the like mounted by the file system 108 as a physical device. The locations 122, 124 may also or instead include a synchronized folder that is synchronized, e.g., to a cloud service provider for file sharing, collaboration, data storage, or the like.

As generally illustrated, the file 126 may be processed while in transit. Thus for example, where the first location 122 is not encrypted and the second location 124 is encrypted, the desired file processing may be encryption or decryption according to the direction that the file is moved, all as generally depicted by arrows labeled "ENCRYPT" and "DECRYPT." It will be appreciated that the file processing contemplated herein may include cryptography, other types of transparent file processing may also or instead be emulated using the techniques described herein such as compression/decompression, changes to file attributes or privileges, and so forth. All such variations that would be apparent to one of ordinary skill in the art are intended to fall within the scope of this disclosure.

Figure 2:
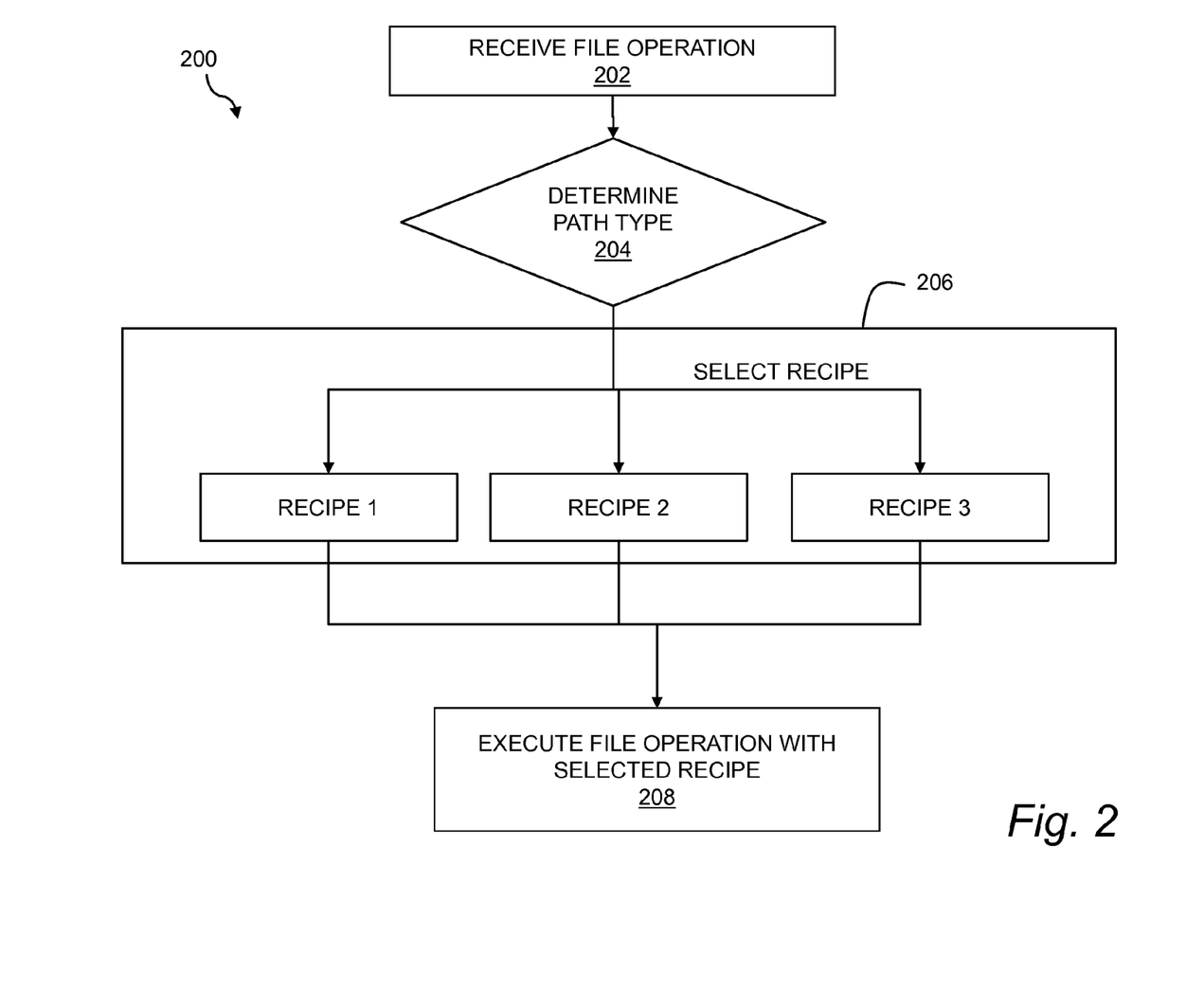
FIG. 2 shows a method for emulating transparent file processing.

FIG. 2 shows a method for emulating transparent file processing. This may be applied, for example, when a file is moved to or from a location within a file system.

As shown in step 202, the method 200 may begin with receiving a file operation. The file operation may be any user-space file operation such as a move, copy, paste, or the like that specifies a label for a volume and a path that specifies a unique location in a file system on the volume. Where the file operation specifies a location with special properties, e.g., an encrypted, compressed, or privileged folder, the file operation may imply certain additional processing on a file or group of files, such as encryption or decryption that accompany a move. Even where the file system does not support transparent file processing of this type, transparent file processing may be emulated using the method 200 further described below.

As shown in step 204, the method 200 may include determining a type for the path. Each path in a file operation may be qualified with a volume that specifies one or more physical or logical devices within the file system. In general, the path may have a type that characterizes certain properties of the corresponding storage. Thus for example, the type may include an existing folder within the file system, a physical device, or a synchronized folder for a remote service. The physical device may be any physical device including without limitation a flash drive, a removable disk, a mobile device, a network drive, or any other physical device that can be connected to a device and accessed by a file system of the device. The synchronized folder may be a dedicated folder for a cloud-based file synchronization service, or any other remotely accessed, synchronized or maintained folder on a device.

As shown in step 206, the method may include selecting a recipe from among a number of different recipes for executing the requested file operation. This selection may be based upon the type of the path. For example, a recipe may include overmounting when the type includes an existing folder. As another example, the recipe may include remounting when the type includes a physical device. As a further example, the recipe may include creating a new label when the type includes a synchronized folder. Each of these recipes is described in greater detail below. Additional recipes may be provided, or alternative recipes may be used, according to the desired file operations, the types of paths recognized by a file system, and so forth.

The recipe may depend in part on the type of function implied by the file operation. Thus for example, where a path identifies an encrypted location, the recipe may encrypt a file when the file is moved to the path by the file operation and decrypt the file when the file is moved from the path. Similarly, where the path identifies a compressed location, the recipe may compress the file when the file is moved to the path by the file operation and decompress the file when the file is moved from the path.

As shown in step 208, the method may include executing the file operation on the file with the selected recipe transparently to a user process that initiated the file operation. In this manner, corresponding functions such as encryption, compression or the like, implied by the move from one location to another within a file system may be transparently performed without any further action or intervention required from a user beyond initiating the requested file operation in user space.

Figure 3:
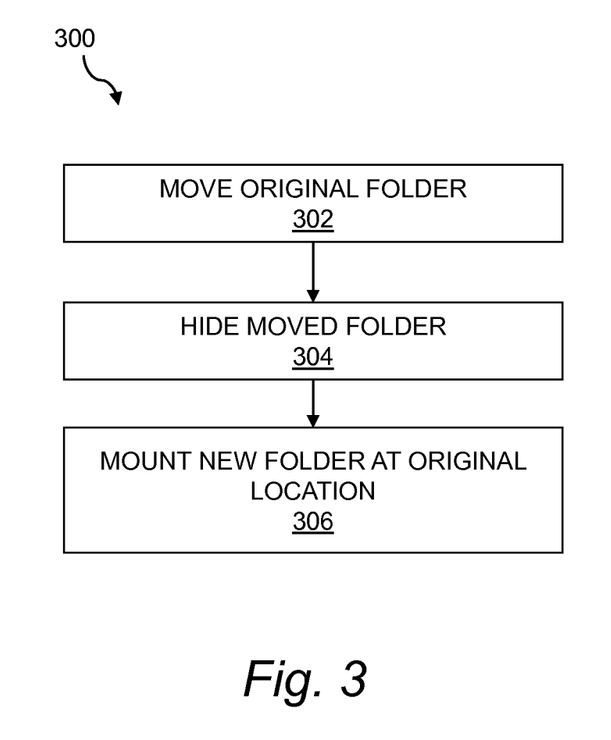
FIG. 3 shows a recipe for an existing folder.

FIG. 3 shows a recipe for an existing folder. As noted above, when the type of path includes an existing folder, the recipe may include overmounting. In general, a method 300 for overmounting to provide a secure folder as contemplated herein includes moving a folder to a new location and the mounting a secure directory using a secure mount point process at the old location.

As shown in step 302, the method 300 may include moving a folder at a unique location in the file system to a new location. This new location, i.e., with a new path, may be created with a rename(2) system call that atomically relinks directory entries on the same file system partition in order to preserve identity of files between the old folder and the new folder.

As shown in step 304, the method 300 may include marking the new location as hidden. This may include explicitly marking the location as hidden, or in Unix-like operating systems, choosing a directory name that starts with a dot, e.g., "/Users/user_1/.hidden_directory."

As shown in step 306, the method 300 may include mounting a secure directory using a secure mount point process at the unique location specified by the path and label. That is, a new secure directory may be created at the old location of the original directory, with a mount process that works like a filter driver in user space to perform cryptographic functions as appropriate on file operations targeting the original path. The resulting encrypted files may be persisted in the original (renamed and hidden) location. As noted above, the mount process located at the overmounted directory may also or instead perform other transparent file operations such as compression or the like. Thus while a secure mount process is one useful embodiment of transparent processing as contemplated herein, other types of transparent processing may be usefully realized using these techniques.

Figure 4:
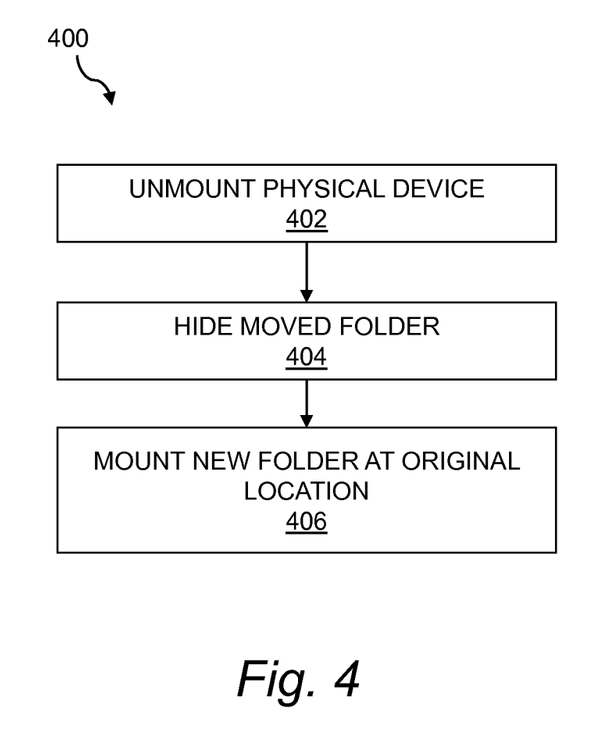
FIG. 4 shows a recipe for a physical device.

FIG. 4 shows a recipe for a physical device. As noted above, when the type of path includes a physical device, the recipe may include remounting the entire physical device. In this context, a rename(2) system call cannot be used directly on the mount point. Although this call may nominally work, it would likely leave the operating system in an unknown state as the in-Kernel mount table entries would not fit the path of the mounted file system. Thus a different approach is required. In general, a method 400 for remounting a physical device to provide a secure folder as contemplated herein includes unmounting the physical device and then mounting a secure directory at the old location.

As shown in step 402, the method 400 may include unmounting the physical device. This may include completely unmounting the device. The physical device may be any physical device including without limitation optical disks, memory cards, USB mass storage such as flash drives or disk drives, removable disk drives, external hard drives, devices such as cameras or smart phones, tapes, and any other peripheral or the like with an accessible directory structure or the like. Physical devices may also or instead include network shares or the like that can be connected and disconnected at any time. As with other removable media and the like, these resources can be accessed simultaneously and shared by multiple users, making it particularly useful to avoid traces of the contemplated recipe on the original mount point.

As shown in step 404, the method 400 may include remounting the physical device at a hidden location. This may be remounted, e.g., using the same naming conventions described above for hidden directories, that is, using a dot prefix for the location. This leaves the original location specified in the path available as a mount point.

As shown in step 406, the method 400 may include mounting a secure directory using a secure mount point process at the unique location specified by the path and label. Once mounted in this fashion, the affect is as described above for the first recipe. One advantage of re-mounting an entire device in this manner is that it does not alter the directory structure contained on the original device in any way. Thus if the device is improperly disconnected or ejected, no trace of the overmounting will exist (except of course for any completed file operations affecting that directory space).

Figure 5:
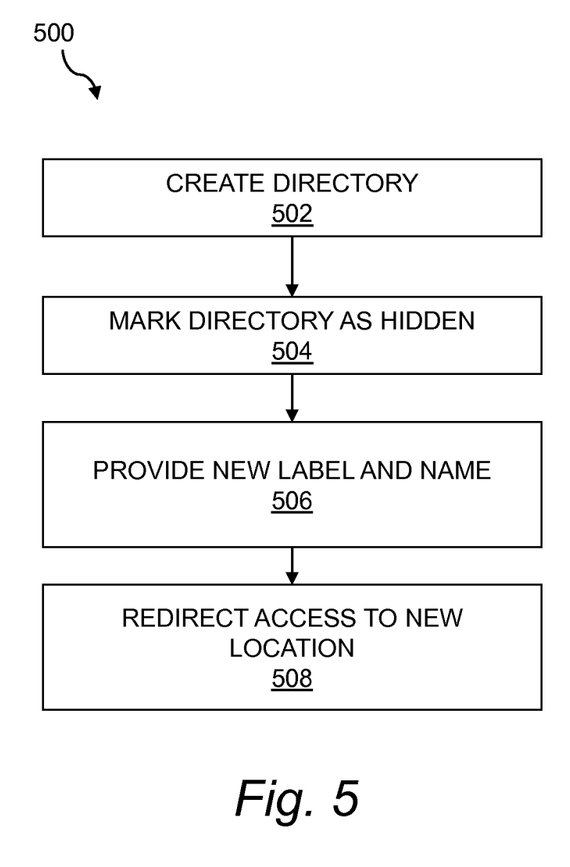
FIG. 5 shows a recipe for a synchronized folder for a remote service.

FIG. 5 shows a recipe for a synchronized folder for a remote service. As noted above, when the type of path includes a synchronized folder, the recipe may include creating a new label for the synchronized folder. Synchronized folders are typically monitored to detect file changes, which may only work on a local file system and not with secure mount points contemplated or other mount point processes contemplated herein. Thus, these folders may require special handling, particularly where a related application requires the file system of the original folder not be changed. In general, a method 500 for creating a new label for a synchronized folder as contemplated herein includes creating the new label and then redirecting access to the original folder to the new location.

As shown in step 502, the method 500 may include creating a directory such as a secure directory using a secure mount process at a new location. This may conveniently be placed at a path location adjacent to the unique location of the synchronized folder. While adjacency is not strictly required, it facilitates simpler renaming and use of the new location.

As shown in step 504, the method 500 may include marking the unique location as hidden using a file system folder attribute. In general, a dot prefix or the like is not appropriate for this type of folder, where the cloud service provider using the folder would expect to find it at a particular location and renaming the folder may prevent the cloud servicing from locating the folder. This may be achieved using any suitable flags of attribute settings in a Unix-like operating system. For example, in Mac OS X, the UF-HIDDEN flag provided by the chflags(2) system call can achieve the same result of hiding the folder without renaming it.

As shown in step 506, the method 500 may include using a new label for the new location and renaming the new location to the unique location. Using the new label, the name of a mounted directory can be changed to the original folder name used by the cloud service provider. For a user, this will provide the same behavior as other overmount types such as those described herein, as long as the operating system file browser (e.g., Finder) is used to interact with the content.

As shown in step 508, the method 500 may include redirecting access to the unique location to the new location. In order to complete the impression that the original directory is overmounted, the operating system file browser (e.g., Mac OS X Finder, or Windows Explorer) should instantly redirect every access to the original directory to its overmounted counterpart. For example, whenever an application such as a cloud synchronization client for the synchronization folder accesses the folder, this should immediately redirect to the overmounted location. If the file browser provides a publicly accessible Application Programming Interface (API) this can be used to support folder redirection as contemplated herein. Alternatively, where no API interface is available, a scripting interface with similar functionality may be used. For example, the OS X Finder does not provide a public API, but it does provide a scripting interface via "Apple Script." In this context, a script can be used to redirect the OS X Finder to the "overmounted" folder whenever a user or application accesses the original directory. Thus, in one aspect, redirecting may include applying a redirection though an application programming interface of a file browser or the like used for file access in the user space. Redirecting may also or instead include applying a redirection with a scripting interface of a file browser.

This method 500 may also be suitable in other contexts. For example, using a centralized directory server such as Microsoft Active Directory or Apple Open Directory, users can be configured to keep their home directory on a network share. The home directory of such a network home is in use whenever the user is logged in and such a directory cannot be unmounted or moved as in the preceding recipes in order to configure the location for transparent file processing. However, the method 500 disclosed in FIG. 5 may be used with such a live folder because the method 500 relies on redirection rather than any change to the target.

This method 500 may similarly be useful with portable home folders or synchronized home folders where synching to a server may not be reliable for a file system in user space (FUSE) mounted volumes. For example, if a file system does not reliably synchronize hidden folders or files from secure mount points, as has been observed for example in OSX Finder, the same techniques used for a cloud provider synchronization may be usefully employed.

As will be apparent to one of ordinary skill in the art, the various systems and methods described herein may be combined with one another.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for emulating transparent file processing, the method comprising:
   receiving a file operation for a file, the file operation being a user-space file operation specifying a label for a volume and a path specifying a unique location in a file system on the volume;
   determining a type for the path, wherein the type is selected from a group consisting of an existing folder in the file system, a physical device, and a synchronized folder for a remote service;
   selecting a recipe for executing the file operation based upon the type, thereby providing a selected recipe, wherein the selected recipe includes overmounting when the type includes the existing folder, remounting when the type includes the physical device, and creating a new label when the type includes a synchronized folder; and
   executing the file operation on the file with the selected recipe transparently to a user process that initiated the file operation, wherein the recipe encrypts the file when the file is moved to the path by the file operation and decrypts the file when the file is moved from the path by the file operation.

2. The method of claim 1 wherein, when the type includes the physical device, the physical device includes one or more of a flash drive, a removable disk, a mobile device, and a network drive.

3. The method of claim 1 wherein, when the selected recipe includes overmounting, overmounting includes:
   moving a folder at the unique location to a new location that atomically relinks directory entries on the same file system partition;
   marking the new location as hidden using a filename; and
   mounting a secure directory using a secure mount point process at the unique location specified by the path and label.

4. The method of claim 1 wherein, when the selected recipe includes remounting, remounting includes:
   unmounting the physical device;
   remounting the physical device at a hidden location; and
   mounting a secure directory using a secure mount point process at the unique location specified by the path and label.

5. The method of claim 1 wherein, when the selected recipe includes creating a new label, creating a new label includes:
   creating a secure directory using a secure mount point process at a new location adjacent to the unique location;
   marking the unique location as hidden using a file system folder attribute;
   using a new label for the new location and renaming the new location to the unique location; and
   redirecting access to the unique location to the new location.

6. The method of claim 5 wherein redirecting includes applying a redirection through an application programming interface of a file browser.

7. The method of claim 5 wherein redirecting includes applying a redirection with a scripting interface of a file browser.

8. A computer program product comprising computer executable code for emulating transparent file processing embodied in a non-transitory computer readable medium that, when executing on one or more computing devices, performs the steps of:
- receiving a file operation for a file, the file operation being a user-space file operation specifying a label for a volume and a path specifying a unique location in a file system on the volume;
- determining a type for the path, wherein the type is selected from a group consisting of an existing folder in the file system, a physical device, and a synchronized folder;
- selecting a recipe for executing the file operation based upon the type, thereby providing a selected recipe, wherein the selected recipe includes overmounting when the type includes the existing folder, remounting when the type includes the physical device, and creating a new label when the type includes a synchronized folder; and
- executing the file operation on the file with the selected recipe transparently to a user process that initiated the file operation, wherein the recipe encrypts the file when the file is moved to the path by the file operation and decrypts the file when the file is moved from the path by the file operation.

9. The computer program product of claim 8 wherein, when the type includes the physical device, the physical device includes one or more of a flash drive, a removable disk, a mobile device, and a network drive.

10. The computer program product of claim 8 wherein, when the selected recipe includes overmounting, overmounting includes:
- moving a folder at the unique location to a new location that atomically relinks directory entries on the same file system partition;
- marking the new location as hidden using a filename; and
- mounting a secure directory using a secure mount point process at the unique location specified by the path and label.

11. The computer program product of claim 8 wherein, when the selected recipe includes remounting, remounting includes:
- unmounting the physical device;
- remounting the physical device at a hidden location; and
- mounting a secure directory using a secure mount point process at the unique location specified by the path and label.

12. The computer program product of claim 8 wherein, when the selected recipe includes creating a new label, creating a new label includes:
- creating a secure directory using a secure mount point process at a new location adjacent to the unique location;
- marking the unique location as hidden using a file system folder attribute;
- using a new label for the new location and renaming the new location to the unique location; and
- redirecting access to the unique location to the new location.

13. The computer program product of claim 12 wherein redirecting includes applying a redirection through an application programming interface of a file browser.

14. The computer program product of claim 12 wherein redirecting includes applying a redirection with a scripting interface of a file browser.

15. A system comprising:
- a device having a processor and a memory; and
- computer code stored in the memory that configures the processor to emulate transparent file processing for a user by performing the steps of receiving a file operation for a file, the file operation being a user-space file operation specifying a label for a volume and a path specifying a unique location in a file system on the volume, determining a type for the path, wherein the type is selected from a group consisting of an existing folder in the file system, a physical device, and a synchronized folder for a remote service, selecting a recipe for executing the file operation based upon the type, thereby providing a selected recipe, wherein the selected recipe includes overmounting when the type includes the existing folder, remounting when the type includes the physical device, and creating a new label when the type includes a synchronized folder, and executing the file operation on the file with the selected recipe transparently to a user process that initiated the file operation, wherein the selected recipe compresses the file when the file is moved to the path by the file operation and decompresses the file when the file is moved from the path by the file operation.

16. A method for emulating transparent file processing, the method comprising:
- receiving a file operation for a file, the file operation being a user-space file operation specifying a label for a volume and a path specifying a unique location in a file system on the volume;
- determining a type for the path, wherein the type is selected from a group consisting of an existing folder in the file system, a physical device, and a synchronized folder;
- selecting a recipe for executing the file operation based upon the type, thereby providing a selected recipe, wherein the selected recipe includes overmounting when the type includes the existing folder, remounting when the type includes the physical device, and creating a new label when the type includes a synchronized folder; and
- executing the file operation on the file with the selected recipe transparently to a user process that initiated the file operation, wherein the recipe compresses the file when the file is moved to the path by the file operation and decompresses the file when the file is moved from the path by the file operation.

17. A computer program product comprising computer executable code for emulating transparent file processing embodied in a non-transitory computer readable medium that, when executing on one or more computing devices, performs the steps of:
- receiving a file operation for a file, the file operation being a user-space file operation specifying a label for a volume and a path specifying a unique location in a file system on the volume;
- determining a type for the path, wherein the type is selected from a group consisting of an existing folder in the file system, a physical device, and a synchronized folder;
- selecting a recipe for executing the file operation based upon the type, thereby providing a selected recipe, wherein the selected recipe includes overmounting when the type includes the existing folder, remounting when the type includes the physical device, and creating a new label when the type includes a synchronized folder; and
- executing the file operation on the file with the selected recipe transparently to a user process that initiated the file operation, wherein the recipe compresses the file when the file is moved to the path by the file operation and decompresses the file when the file is moved from the path by the file operation.

* * * * *